Nov. 25, 1930.                    C. BOOTH                    1,783,034
                PROCESS OF PRODUCING NONCYLINDRICAL ARTICLES
                             Filed June 25, 1928
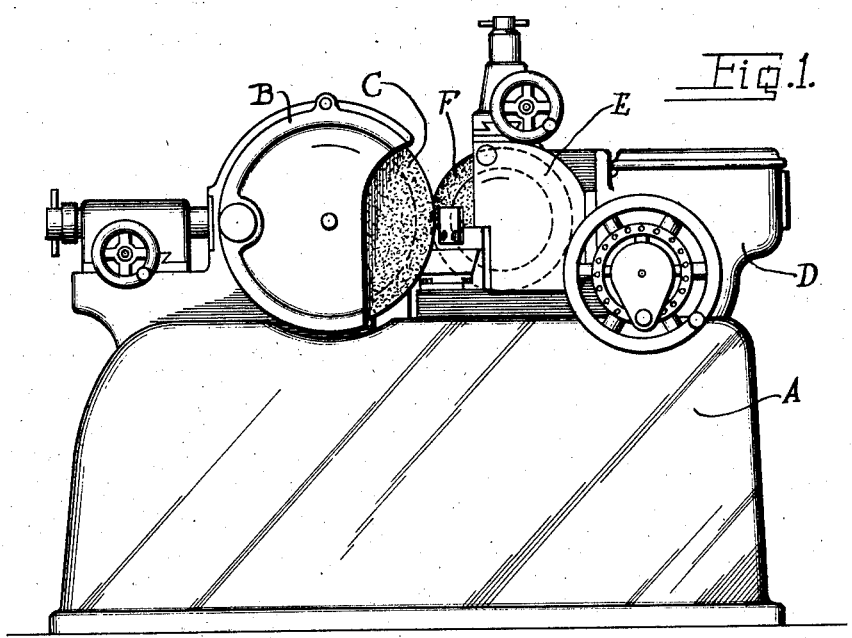
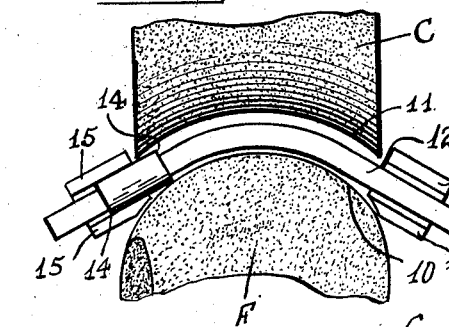
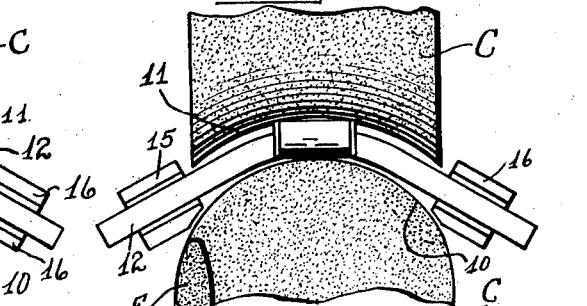
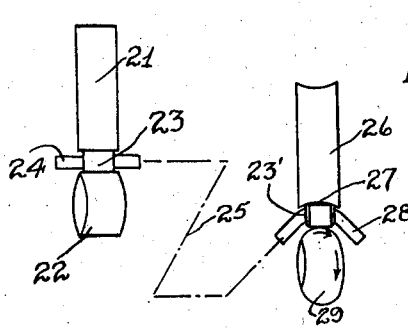
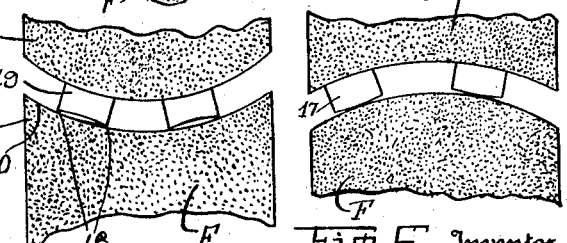
Inventor
CLEMENT BOOTH,
By A. K. Parsons
Attorney Patented Nov. 25, 1930

1,783,034

UNITED STATES PATENT OFFICE

CLEMENT BOOTH, OF CINCINNATI, OHIO, ASSIGNOR TO CINCINNATI GRINDERS INCORPORATED, OF CINCINNATI, OHIO, A CORPORATION OF OHIO

PROCESS OF PRODUCING NONCYLINDRICAL ARTICLES

Application filed June 25, 1928. Serial No. 287,999.

This invention relates to an improved process for the production of non-cylindrical articles and has particular reference to the grinding of such articles to a prescribed form which shall be of circular shape in cross section but of nonuniform diameter.

The improved process may be advantageously employed for the production of either barrel shaped or concave hour glass shapes, for the production of beveled or chamfered ends on cylindrical rolls or for other like purposes.

The principal object of the present invention is the provision of a process which will greatly reduce the time consumed in the formation of such articles and obviate the necessity for complicated machines, and the use of work holding chucks, centering devices or the like as well as eliminating the time consumed in loading and unloading such fixtures.

More specifically the present invention has for an additional object the provision of an improved process particularly adapted for the production of cylindrical rolls or the like having a central cylindrical portion of uniform diameter and terminal portions of reduced form.

In the production of various articles and as a specific instance, the production of cylindrical rolls suitable for use in roller bearings, for example, it is necessary that the body portion of the work piece be formed to true cylindrical form of absolutely accurate diameter and it is also desirable that the terminal edges be chamfered off or beveled to eliminate the presence of a sharp edge at the ends of the work piece.

Prior to the present invention it has been necessary in the performance of this operation to hold the individual work pieces in special fixtures or the like for this grinding. The present invention however contemplates a process of production of these ends without so chucking the articles. The general process of manufacture therefore consists in first providing a substantially cylindrical work piece of the proper length for the finished article and without additional extensions or the like to be cut off as has been frequently necessary in the past. The article is then ground as in a centerless grinder to predetermined exact cylindrical form and diameter accurate within a fractional thousandth of an inch. In the carrying out of the present process it is contemplated that this operation be performed in a centerless grinder which will automatically produce the work piece of proper diameter while at the same time allowing it to center itself by a floating movement between the grinding and regulating wheels. In this manner the work piece establishes its own axis as distinguished from those processes of manufacture in which the work is held in centers by a chuck or the like and is ground about a definite and predetermined axis. This centerless method of manufacture has been found to be most efficient in the rapid production of articles of this type. Due to the floating action however it is impracticable, if not impossible, to form beveled terminal portions on the work piece during the cutting off operation or the like as is feasible when the work is ground to a predetermined axis, for the reason that the establishment of the final work axis at a different point from the initial axis of the crude or rough work piece would cause a subsequent uneven location of a preformed bevel or possibly an accentuated bevel at one side and a substantially sharp non-beveled edge at the opposite side of the work piece.

In the continuation of the present process the work having been initially produced to final cylindrical form by floatation and self-determination of its axis it is then correspondingly beveled by being mounted for continued floatation in the same manner in which it was initially produced on a support rotatably supporting the work piece for spinning or rotation thereon, between means laterally frictionally engaging the work piece and controlling its rotation and an additional member so formed as to exert an equal pressure against the termini of the supported and rotated work piece said additional members being preferably a shaped grinding wheel which will simultaneously bevel off or chamfer the two edge corners of the roll.

The same general process of manufacture may be advantageously employed in the production of barrel shaped rolls which may be first advantageously produced to cylindrical form and then passed between a grinding wheel having the desired curve formed therein which is to be produced on the finished roll, or for the production of hour glass type rolls in which the grinding wheel has a convex curve.

In order that the manner in which the final steps of the process is performed may be best understood certain structural and diagrammatic views thereof are embodied in the accompanying drawings.

Figure 1 is a side elevation of the machine for carrying out of the final or roll shaping step of the process.

Figure 2 is a fragmentary plan view of the work and wheels.

Figure 3 is a similar view showing the work in ground condition between the wheels.

Figure 4 is a diagrammatic view of the complete process for production of the type of roll shown in Figure 3.

Figure 5 is a fragmentary view illustrating barrel roll production.

Figure 6 is a similar view of the process by which hour glass type rolls are produced.

In the drawings "A" designates the bed of a conventional centerless grinder having supported thereby a housing "B" in which is rotatably mounted a grinding wheel "C". Similarly the bed is provided with a sliding unit "D" including a regulating wheel housing "E" bearing a regulating wheel "F". These parts in their general nature, relationship and drive are of conventional centerless grinder type having no distinctive structural details requiring more specific description.

In ordinary centerless grinder practice however it has been customary to provide a work rest extending transversely of the face of the wheels and to shape the wheels in such manner that the work is either passed in a continuous stream axially between the parallel or substantially parallel faces of the grinding and regulating wheels or, in the case of formed wheels, the work is introduced into the throat between the wheels then the wheels are brought together for engagement with the work and subsequently separated for ejection.

The present process contemplates an alternative use of the mechanism, in that the regulating wheel is formed with a pronouncedly convex work engaging surface 10 and the grinding wheel with an opposed concave peripheral surface 11. The work rest intended to support the work during the present grinding action comprises an arcuate member 12 fitting around between the wheels and substantially following the transverse curve of the throat thus provided. Attention is invited to the fact that as distinguished from customary types of work rest blades having angle top work supporting portions the present rest is shown and preferably employed as flat topped so that it will properly engage the work during the entire movement of the work about the arc of the rest. The work piece 13 is shown of cylindrical form and as initially produced with sharp corners or edges as at 14 and the rest itself or work rest bracket bears the entrance guides 15 and discharge guides 16 to facilitate introduction and removal of the work pieces.

The use of the mechanism in question will be best understood by reference to Figures 2 and 3 from which it will be noted that as the work piece passes around the arcuate rest the central cylindrical portion thereof will engage and be in contact with the convex surface 10 of the regulating wheel. This regulating wheel as is customary in centerless grinders is preferably disposed with its operative surface traveling at an angle to the work rest blade to exert a feed thrust or component urging the work axially through the machine. Also it is to be understood the regulating wheel is actuated at a slow rate of speed as for example 30 revolutions per minute and upwardly as respects the work rest or in the direction indicated by the arrow in Figure 1 to control the direction and rate of rotation of the work piece. At the same time the grinding wheel operates downwardly toward the work rest as indicated by the arrow on its housing in Figure 1. The grinding wheel is rotated at a high rate of speed such as 5,000 feet surface speed a minute to perform proper grinding.

From the foregoing description it will be seen that the improved process of producing terminally chamfered cylindrical bodies or the like consists in initially producing the articles to final circular form in cross section by floatation grinding permitting the articles to find and determine their own axis, and subsequently floating the articles between a work positioning and controlling member engaging the central preformed surface of the work piece on the one hand and a work shaping member in opposition to the work positioning member and equally terminally engaging the ends of the work piece to bevel or chamfer same.

The general process of production of barrel shaped rolls such as the roll 17 shown in Figure 5 is similar to that just described, the essential difference being that the type of grinding performed on the roll of Figure 2, for example, must be continued until the entire roll body has been ground in the event that initial cylindrical stock is employed. It will be understood however that if preferred the roll may be given an initial barrel like shape in which event a substantial uniform amount will be removed from all parts thereof.

Likewise in the case of the roll shown in Figure 6 the same process is used with the distinction that the grinding wheel "C" is made with a convex surface grinding into the central portion of the roll while the terminal edges 18 of the work piece 19 contact with the concave face 20 of the regulating or controlling member "F".

In each instance shown the process consists in axially progressing a work piece in an arcuate path between a suitably shaped grinding member engaging all or predetermined portions of the article to be operated upon and an opposed control member having point contact with the work piece either at the center thereof as in the case of the cylindrical and barrel rolls or a double point contact as with the two edges 18 of the concave roll.

As illustrative of the complete process particular reference is made to the diagrammatic view to Figure 4 of the drawings in which is shown a primary grinding wheel 21 in opposition to an angularly disposed work feeding and controlling wheel 22 said wheels jointly operating upon a work piece 23 floating therebetween on work rest 24 to produce a cylindrical article by through feed grinding methods. Coupled therewith in Figure 4 through the continuation path 25 indicating progress of the work to a subsequent step in the process is a second through feed mechanism comprising a grinding wheel 26 having a transversely curved surface 27 contra-generic to the surface to be produced on the work 23' which is floated on the arcuate work rest 28 and controlled as to feed and rotation by the regulating wheel 29 which has a curved surface contra-generic to that of the grinding wheel and consequently of the same genus but not the same radius or curve as that produced upon the work.

Particular attention is invited to the fact that the present process not only greatly expedites the time of production of articles of this nature but also for the first time makes it possible to produce such articles by a lateral progressive movement as respects the grinding wheel surface as distinguished from direct in-feed grinding, this progression reducing the liability of scratching or grooving of the work by recurrent irregularities of the grinding wheel surface in a given plane and also tends to maintain the accuracy of the grinding wheel surface in that the movement of the work is substantially a generative one distributing wear equally in the arcuate path transversely of the grinding wheel in place of recurrent uni-point wear customary with in-feed grinding methods.

I claim:

1. The process of producing a non-cylindrical roll consisting in axially progressing a work piece in an arcuate path defined by a grinding member and a control member having contra-generic transversely curved work engaging surfaces.

2. The process of producing a non-cylindrical roll consisting in peripherally supporting a work piece for rotation between a pair of opposed work engaging members having contra-generic work engaging surfaces, rotating one of said members at a high or grinding rate of speed to remove the desired amount of stock, rotating the other of said members at a slow work controlling rate, and advancing the work in an arcuate path concentric with the arcuate surface of the grinding member.

3. The process of producing non-cylindrical bodies of circular cross-section, consisting in floating a work piece in contact with a grinding member having a transversely curved operative face contra-generic to the longitudinal curve to be produced on the work piece and longitudinally urging the work piece transversely of the grinding member by a friction control member having lateral contact therewith.

4. The process of producing a roll or the like having reduced ends consisting in grinding the body portion thereof to predetermined size, rotatably supporting the member on said preformed surface and simultaneously engaging and chamfering the ends of the work piece while thus supported.

5. The process of producing a cylindrical roll having reduced ends consisting in preforming the cylindrical portion thereof to final form, subsequently supporting the article on said preformed surface, frictionally engaging the preformed surface at a circumferentially spaced point for controlling the rotation thereof, and terminally engaging the edges thereof by a beveling member operating in opposition to the friction engaging member.

6. The process of beveling the ends of rolls consisting in passing the rolls through a transversely arcuate throat between grinding and regulating wheels, controlling the position of the work by central engagement of the regulating wheel therewith and terminally engaging the work by the grinding wheel to remove the edge corners thereof.

7. The process of producing a work piece having a ground body portion of cylindrical form and terminal beveled ends consisting in initially axially passing the work piece thru a centerless grinder having plain work engaging surfaces for simultaneous engagement with the work piece for positioning and grinding the same, and subsequently axially passing the preformed work piece through a centerless grinder having substantially concentric contra-generic surfaces adapted respectively, centrally and terminally to engage the work piece.

8. The process of producing non-cylindrical bodies of circular cross section by centerless grinding consisting in initially shaping the body portion thereof to cylindrical form by axially advancing same along a peripheral support between grinding and rotation controlling members having substantially parallel lines of contact therewith and subsequently deforming said surface of the work piece by axially advancing the work in an arcuate path defined by grinding and rotation controlling members having transversely curved work engaging surfaces.

In testimony whereof I affix my signature.

CLEMENT BOOTH.